(12) United States Patent
Bonwick (10) Patent No.: US 6,725,244 B1
(45) Date of Patent: Apr. 20, 2004

(54) METHOD AND SYSTEM FOR ALLOCATION OF FILE DESCRIPTORS

(75) Inventor: Jeffrey S. Bonwick, Los Altos, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/512,841

(22) Filed: Feb. 25, 2000

(51) Int. Cl.$^7$ .............................................. G06F 12/00
(52) U.S. Cl. ..................................... 707/205; 707/100
(58) Field of Search ............................... 707/1–4, 7, 8, 707/100–104.1, 200, 201, 204, 205, 9; 711/1, 100, 110, 200, 202

(56) References Cited

U.S. PATENT DOCUMENTS

| | | | | |
|---|---|---|---|---|
| 3,916,387 A | * | 10/1975 | Woodrum ....................... 707/3 |
| 4,833,624 A | * | 5/1989 | Kuwahara et al. ........ 318/568.2 |
| 5,077,760 A | * | 12/1991 | Lepage ....................... 358/409 |
| 5,321,837 A | * | 6/1994 | Daniel et al. ............... 707/101 |
| 5,402,369 A | * | 3/1995 | Main .......................... 708/620 |
| 5,544,353 A | * | 8/1996 | Forman et al. ................ 707/8 |
| 5,568,487 A | * | 10/1996 | Sitbon et al. ............... 370/466 |
| 5,600,651 A | * | 2/1997 | Molle ......................... 370/448 |
| 5,717,919 A | * | 2/1998 | Kodavalla et al. ............ 707/10 |
| 5,809,295 A | * | 9/1998 | Straub et al. .................. 707/1 |
| 5,991,771 A | * | 11/1999 | Falls et al. .................. 707/202 |
| 6,012,053 A | * | 1/2000 | Pant et al. ................... 345/866 |
| 6,016,507 A | * | 1/2000 | Carroll et al. .............. 709/217 |
| 6,329,985 B1 | * | 12/2001 | Tamer et al. ................ 345/532 |

OTHER PUBLICATIONS

G. Banga & J. Mogul, "Scalable kernel performance for Internet servers under realistic loads", Western Research Laboratory, Digital Equipment Corporation, Oct. 1998.

* cited by examiner

*Primary Examiner*—Greta Robinson
*Assistant Examiner*—Harold E. Dodds, Jr.
(74) *Attorney, Agent, or Firm*—Beyer, Weaver & Thomas, LLP.

(57) ABSTRACT

Improved techniques for allocating file descriptors are disclosed. According to one aspect, the file descriptors are stored in a tree-like data structure. The tree-like data structure is a data structure that includes a plurality of nodes arranged in the tree-like structure. The nodes have numeric values that are the file descriptors represented in a binary format. Each of the nodes also maintains an allocation count and an indication whether or not a particular node is available (i.e., unallocated). Preferably, the tree-like structure is an infix binary tree in which each node records the number of file descriptors within its right subtree (including itself) that are already allocated. The improved techniques allow file descriptors to be allocated much more efficiently than conventionally achieved.

22 Claims, 5 Drawing Sheets

METHOD AND SYSTEM FOR ALLOCATION OF FILE DESCRIPTORS

BACKGROUND OF THE INVENTION

1. Field of the Invention

The present invention relates to computer systems and, more particularly, to opening and closing files by operating systems running on computer systems.

2. Description of the Related Art

It is well known that a computer system executes an operating system to perform fundamental operations of the computer system. In this regard, an operating system opens files for use by a computer system and then assigns the open file a numeric number known as a file descriptor. For example, the command open ("/usr/bin/ls") is an open system call for a UNIX-based operating system and "/usr/bin/ls" is the path name to a particular file to be opened. In response to the open system call, the operating system returns the smallest available file descriptor. The file descriptor is an integer that represents the file that has been opened by the open system call. Hence, once a file has been opened, the file descriptor is used in subsequent commands that access the open file. One advantage of using file descriptors over path names is that the operating system readily understands the integer value as identifying a particular file without having to parse a path name to locate the particular file. Another advantage of using file descriptors is that some system calls do not initially specify particular files (i.e., path names) to be processed so the file descriptors are needed in these situations to initially refer to files.

One problem with conventional implementations of open system calls is that in order for an operating system to identify an available file descriptor, an involved search of the available file descriptors must be made. In other words, the operating system supports a certain number of file descriptors that can be allocated to the files being opened. As a file is opened with an open system call and a file descriptor assigned, the file descriptor is thereafter unavailable until the open file is subsequently closed and the file descriptor released. It is understood that the smallest available file descriptor is the file descriptor that is normally to be assigned.

Conventionally, the file descriptors are maintained in a file descriptor table and, when an open system call is issued, a linear search of the file descriptor table would be performed to locate the smallest available entry in the file descriptor table. Unfortunately, the linear search of the file descriptor table is time consuming and not very efficient in locating the smallest available file descriptor. Typically, the file table would be searched in a linear manner starting from the beginning (i.e., file descriptor "0") and continuing until an available file descriptor is found or the entire file descriptor table has been traversed without success.

As operating systems continue to become more complex, the number of file descriptor supported likewise continues to increase. Today, an operating system often supports millions of file descriptors. Hence, the linear search through the file descriptor table is becoming more inefficient as operating systems advance. More recently, it has been suggested that bitmaps can be used to speed up the linear search of the file descriptor table by a constant factor. See, G. Banga & J. Mogul, "Scalable kernel performance for Internet servers under realistic loads", Western Research Laboratory, Digital Equipment Corporation, October 1998. While this bitmap technique is useful if the number of file descriptors is not too large, it is inadequate for large numbers of file descriptors. Hence, with modern operating systems supporting millions of file descriptors, the use of bitmaps to speed up the linear search provides only a minor improvement.

Thus, there is a need for improved approaches to allocate file descriptors.

SUMMARY OF THE INVENTION

Broadly speaking, the invention relates to improved techniques for allocation of file descriptors. According to one aspect of the invention, the file descriptors are stored in a tree-like data structure. The tree-like data structure is a data structure that includes a plurality of nodes arranged in the tree-like structure. The nodes have numeric values that are the file descriptors represented in a binary format. Each of the nodes also maintains an allocation count and an indication whether or not a particular node is available (i.e., unallocated). Preferably, the tree-like structure is an infix binary tree in which each node records the number of file descriptors within its right subtree (including itself) that are already allocated. Further, the tree-like data structure does not need to utilize customary left, right and parent pointers, but instead uses the features of the infix binary tree.

The invention can be implemented in numerous ways, including as a method, system, device or a computer readable medium. Several embodiments of the invention are discussed below.

As a method for allocating a file descriptor, one embodiment of the invention includes the acts of: providing a plurality of file descriptors in a tree-like data structure, searching the tree-like data structure to determine a smallest one of the file descriptors that is available, and allocating the one of the file descriptors that is determined to be the smallest.

As a data structure for use by a computer program in managing allocation of file descriptors, one embodiment of the invention includes at least a plurality of nodes, and an allocation count provided for each of the nodes. Each of the nodes represents a numeric value of one of the file descriptors, and the nodes are arranged in a tree like arrangement with subtrees. The allocation count for each node indicates the number of nodes allocated in the node and its associated subtree.

As an infix binary tree for use by a computer program in managing allocation of file descriptors, one embodiment of the invention includes at least: a plurality of nodes, each of the nodes representing a numeric value of one of the file descriptors; and an allocation count provided for each of the nodes.

As a computer readable medium including computer program code for allocating a file descriptor, one embodiment of the invention includes at least: computer program code for providing a plurality of file descriptors in a tree-like data structure; computer program code for searching the tree-like data structure to determine a smallest one of the file descriptors that is available; and computer program code for allocating the one of the file descriptors that is determined to be the smallest.

As a computer system, one embodiment of the invention includes at least a processor and an operating system executable on the processor. The operating system operates to allocate a file descriptor in response to a system call. The operating system includes at least: computer program code for providing a plurality of file descriptors in a tree-like data structure; computer program code for searching the tree-like data structure to determine a smallest one of the file descriptors that is available; and computer program code for allocating the one of the file descriptors that is determined to be the smallest.

The advantages of the invention are numerous. Different embodiments or implementations may yield one or more of the following advantages. One advantage of the invention is that appropriate file descriptors to be allocated can in general be located (i.e., via searching) much more efficiently than conventionally achieved. Another advantage of the invention is that the approach utilized is well suited for use with operating systems that support large number of file descriptors.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention provides improved techniques for allocating file descriptors. According to one aspect of the invention, the file descriptors are stored in a tree-like data structure. The tree-like data structure is a data structure that includes a plurality of nodes arranged in the tree-like structure. The nodes have numeric values that are the file descriptors represented in a binary format. Each of the nodes also maintains an allocation count and an indication whether or not a particular node is available (i.e., unallocated). Preferably, the tree-like structure is an infix binary tree in which each node records the number of file descriptors within its right subtree (including itself) that are already allocated. Further, the tree-like data structure does not need to utilize customary left, right and parent pointers, but instead uses the features of the infix binary tree.

Embodiments of this aspect of the invention are discussed below with reference to FIGS. 1–5B. However, those skilled in the art will readily appreciate that the detailed description given herein with respect to these figures is for explanatory purposes as the invention extends beyond these limited embodiments.

Figure 1:
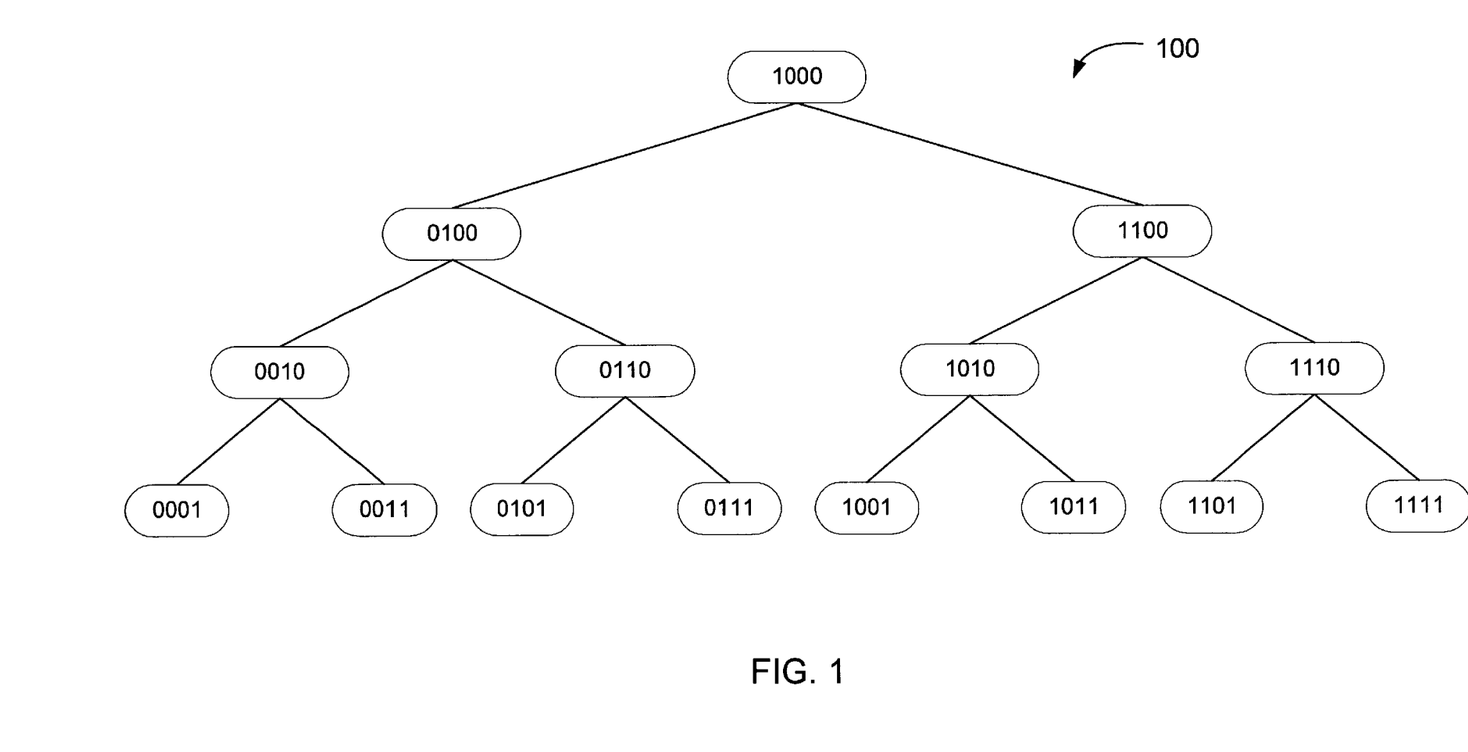
FIG. 1 illustrates a representative infix binary having a file descriptor at each of its nodes according to one embodiment of the invention.

FIG. 1 illustrates a representative infix binary tree 100 rooted at eight (binary 1000) according to one embodiment of the invention. The infix binary tree 100 illustrated in FIG. 1 covers the range of 1–15 (binary 0001–1111) with its fifteen nodes. The infix binary tree 100 has a plurality of levels with lower levels having more nodes. As shown in FIG. 1, the infix binary tree 100 has four (4) levels, though it should be understood that in general an infix binary tree can have two or more levels. Each of the nodes of the infix binary tree 100 has an integer value, in binary, associated therewith. These integer values are the file descriptors that are allocated to files when files are opened. As noted above, files are opened by an operating system through system calls, such as open system calls.

More specifically, the infix binary tree 100 has the following properties:

(1) The least-significant bit (LSB) of any node (namely, the first bit from the right that is "1") is equal to its level in the tree. With respect to the infix binary tree 100, nodes 0001, 0011, 0101, 0111, 1001, 1011, 1101 and 1111 are at level zero; nodes 0010, 0110, 1010 and 1110 are at level one, and 0100 and 1100 are at level two; and 1000 is at level three.

(2) The child size ("CSIZE") of the node N (that is, the total number of descendents in a child of node N including itself) is given by clearing all the bits but the least significant bit of the node N. For example, the child size of node 0010 is 0010, the child size of node 1011 is 0001, and the child size of node 1100 is 0100.

(3) The nearest left ancestor (LPARENT) of node N (that is, the nearest ancestor containing node N in its right child) is given by clearing the least significant bit of node N. For example, the nearest left ancestor (LPARENT) of 0110 is 0100. Also, it should be noted that clearing the least significant bit of nodes 0001, 0010, 0100 and 1000 yield 0, thereby indicating that these nodes are left most nodes. It should also be noted that this procedure automatically skips generations as necessary. For example, the nearest left ancestor of node 1010 is 1000, with the node 1100 being skipped over because it is a right ancestor.

Accordingly, the nearest left ancestor (LPARENT) is obtained by clearing the least significant bit, whereas the child size (CSIZE) is obtained by clearing all but the least significant bit. Hence, the nearest left ancestor (LPARENT) of node N can also be determined in terms of child size (CSIZE). Namely, LPARENT(N)=N−CSIZE(N). Also, the nearest right ancestor (RPARENT) of node N can be determined in terms of child size (CSIZE), namely, RPARENT (N)=N+CSIZE(N). Further, the children of interior nodes differ from their parents by CSIZE(parent)/2. For example, the child size of parent node 1000/2=4=0100 binary, and the child nodes 0100 and 1100 of parent node 1000 differ from 1000 by plus or minus 0100. These properties of the infix binary tree 100 allow efficient movement through the data structure without having to store and utilize customary left, right and parent pointers.

Figure 2:
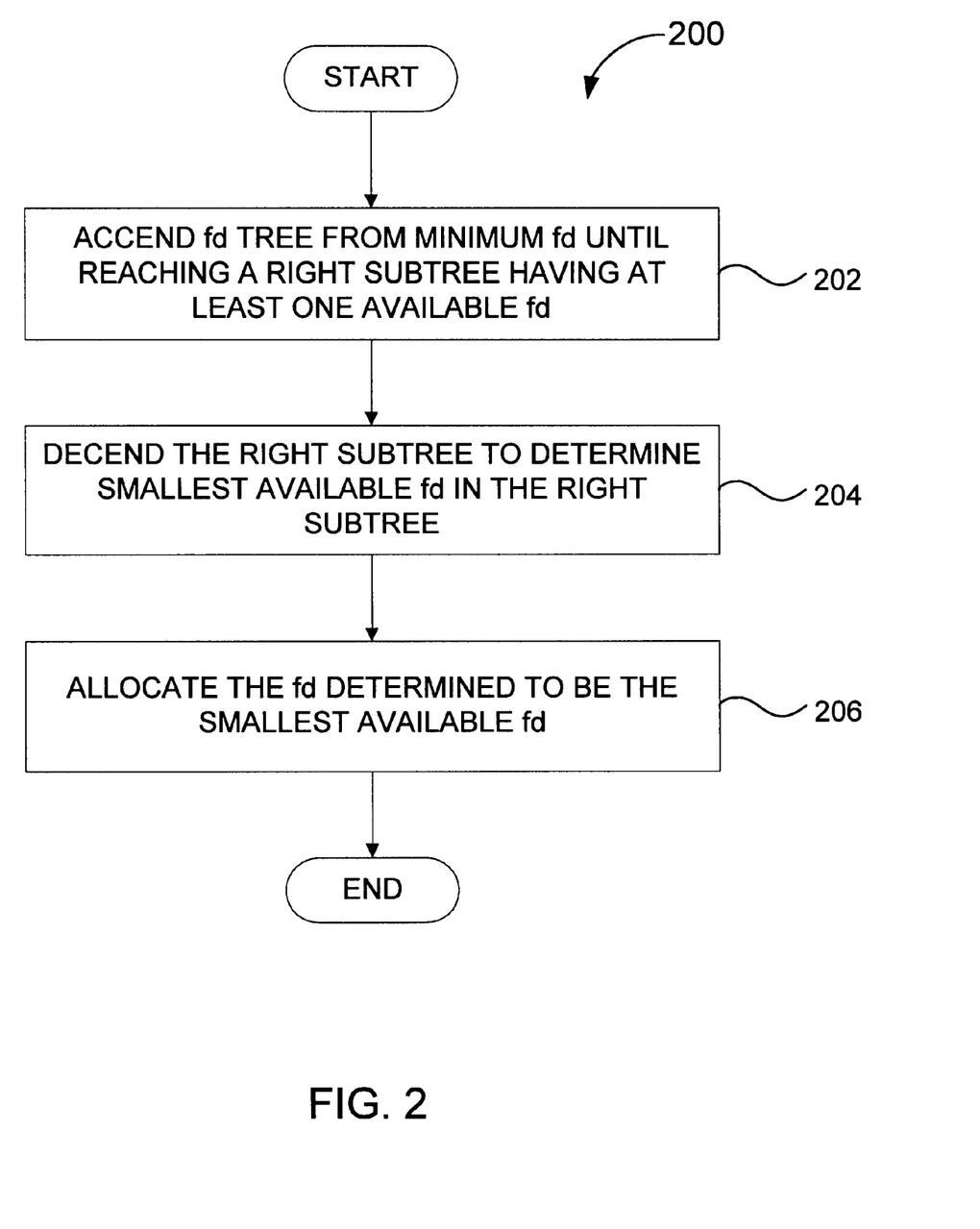
FIG. 2 is a flow diagram of file descriptor allocation processing according to one embodiment of the invention.

FIG. 2 is a flow diagram of file descriptor allocation processing 200 according to one embodiment of the invention. The file descriptor allocation processing 200 is, for example, performed by an operating system. Typically, the file descriptor allocation processing 200 is invoked when a system call (e.g., open system call) is issued to the operating system.

The file descriptor allocation processing 200 initially ascends 202 a file descriptor (fd) tree from a minimum fd until reaching a right subtree having at least one available file descriptor (fd). Here, the file descriptor allocation processing 200 begins at the minimum fd and ascends the fd tree to larger fd nodes until reaching a node having a right subtree with at least one available file descriptor (fd). The ascending is easily achieved by moving to the nearest right ancestor (RPARENT) of the current node when the current node and its child nodes are already allocated and thus unavailable. Once the right subtree of the current node has at least one available file descriptor (fd), the ascending stops.

Next, the right subtree having the at least one available file descriptor (fd) is descended 204. The descending 204 with the right subtree is performed to determine the smallest available file descriptor (fd) in the right subtree. Once the smallest available file descriptor (fd) has been determined, the fd determined to be the smallest available file descriptor (fd) is allocated 206. Thereafter, the file descriptor allocation processing 200 is complete and ends.

For example, consider the file descriptor allocation processing 200 in the context of the infix binary tree 100 illustrated in FIG. 1. Assume that nodes 0001, 0010, 0011 and 0100 are currently allocated and that other nodes of the infix binary tree 100 are currently unallocated (i.e., available). Applying the file descriptor allocation processing 200 to this example, the minimum fd is normally the node 0001, particularly for an open system call; however, it should be understood that the minimum fd can be set to another node (e.g., fcntl system call). Hence, the ascending 202 from the node 0001 is performed until a right subtree having at least one available fd is determined. Here, the file descriptor allocation processing 200 would ascend from node 0001 to node 0010 and then to node 0100 which would be the node having an available file descriptor in its right subtree. Note that, according to this example, neither of the node 0001 or 0010 had any available file descriptors in their right subtrees. Then, from node 0100, the right subtree of node 0100 is descended to determine the smallest available file descriptor within the right subtree. The right subtree of the node 0100 begins at node 0110 at includes its child node 1010 and 0111. Here, in this example, each of the nodes 0101, 0110 and 0111 are all available. Hence, the descending 204 of the right subtree begins at node 0110 and then further descends to the node 0101 which is the smallest available file descriptor within the right subtree of node 0100. Thereafter, the file descriptor 0101 is allocated 206 and thereafter becomes unavailable until subsequently released (or unallocated). As an example, an allocated file descriptor becomes available after it is released or unallocated by the operating system, such as with a close system call.

Figure 3:
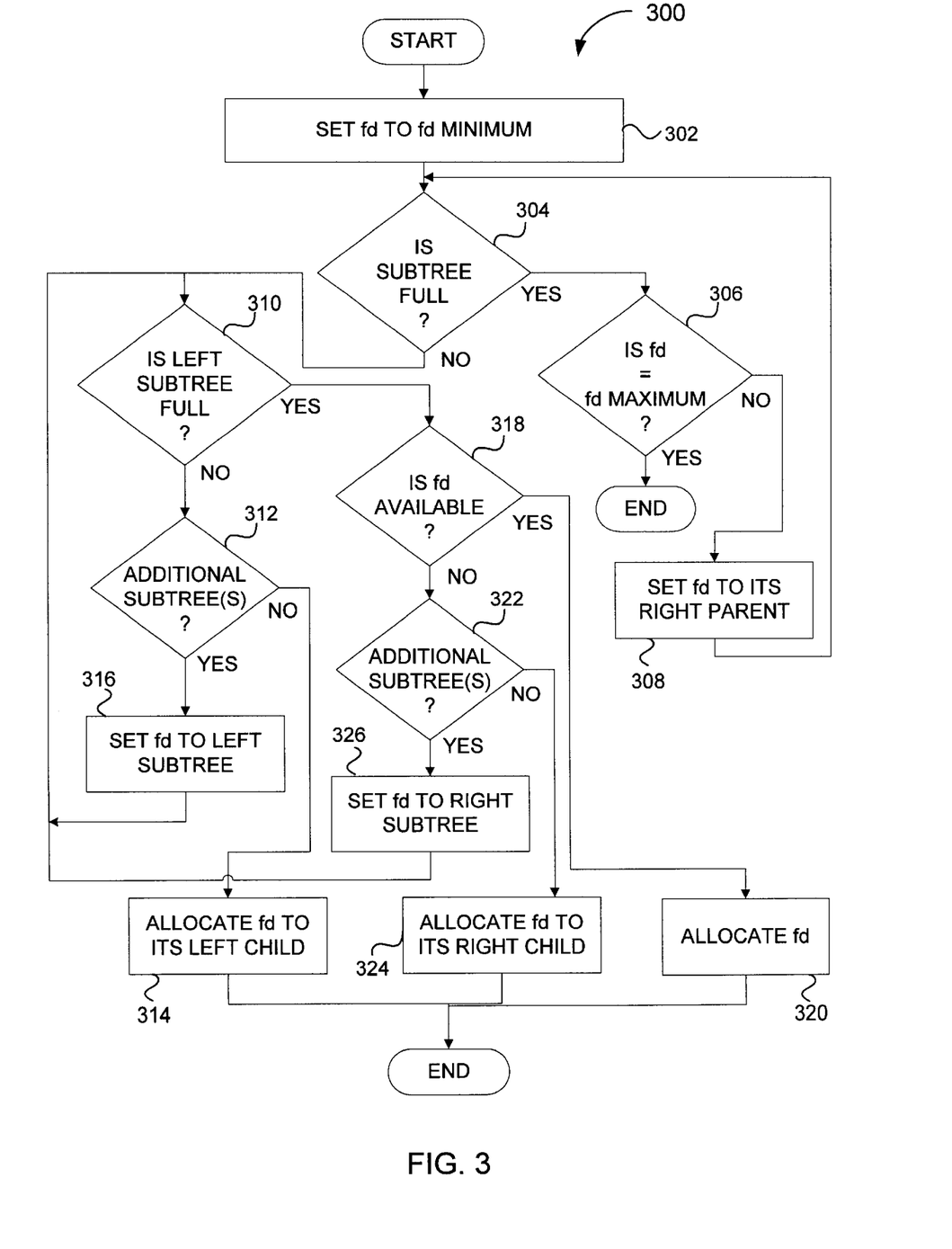
FIG. 3 is a flow diagram of file descriptor allocation processing according to another embodiment of the invention.

FIG. 3 is a flow diagram of file descriptor allocation processing 300 according to another embodiment of the invention. The file descriptors are stored in a file descriptor (fd) tree. The file descriptor allocation processing 300 is, for example, performed by an operating system in response to an open system call.

The file descriptor allocation processing 300 initially sets 302 a file descriptor to a minimum file descriptor (fd minimum). Next, a decision 304 determines whether the subtree associated with the file descriptor (fd) is full. When the decision 304 determines that the subtree associated with the file descriptor (fd) is full, then a decision 306 determines whether the file descriptor (fd) is equal to a maximum file descriptor (fd maximum). When the decision 306 determines that the file descriptor (fd) is equal to the fd maximum, then the file allocation processing 300 is complete and ends because the fd tree has been determined to be completely full. Hence, in this situation, a file allocation number is not able to be determined and allocated. On the other hand, when the decision 306 determines that the file descriptor (fd) is not the fd maximum, then the file descriptor (fd) is set 308 to its right parent. After the file descriptor (fd) is set 308 to its right parent, the file allocation processing 300 returns to repeat the decision 304 and subsequent operations. Hence, the processing at operations 304–308 serves to ascend the fd table until a subtree having available file descriptors is found.

Once the decision 304 determines that the subtree associated with the file descriptor (fd) is not full, then additional processing is performed to find the smallest available file descriptor (fd) in the subtree. Namely, a decision 310 determines whether the left subtree (of the subtree) is full. When the decision 310 determines that the left subtree is not full, then a decision 312 determines whether one or more additional subtrees are present below the current left subtree. When the decision 312 determines that there are no additional subtrees below the current left subtree, then the file descriptor (fd) is allocated 314 to the left child of the subtree. On the other hand, when the decision 312 determines that there are one or more subtrees below the current left subtree, then the file descriptor (fd) is set 316 to the left subtree below the current left subtree. Following the operation 316, the file allocation processing 300 returns to repeat the decision 310 and subsequent operations for the now current subtree (which was previously the left subtree).

On the other hand, when the decision 310 determines that the left subtree is full, then a decision 318 whether the file descriptor (fd) is available. Here, the file descriptor (fd) is the file descriptor of the root node of the subtree. If the file descriptor (fd) for the root node of the subtree is available, then the file descriptor (fd) is allocated 320. Alternatively, when the decision 318 determines that the file descriptor (fd) of the root node of the subtree is not available, then a decision 322 determines whether one or more additional subtrees are present below the current subtree. When the decision 322 determines that there are no additional subtrees below the current subtree, then the file descriptor is allocated 324 to its right child. On the other hand, when the decision 322 determines that there are one or more additional subtrees below the current subtree, then the file descriptor (fd) is set 326 to the right subtree. After the file descriptor (fd) has been set 326 to the right subtree, the file allocation processing 300 returns to repeat the decision 310 and subsequent operations. Following each of the operations 314, 320 and 324, the file allocation processing 300 is complete and ends.

Figure 4:
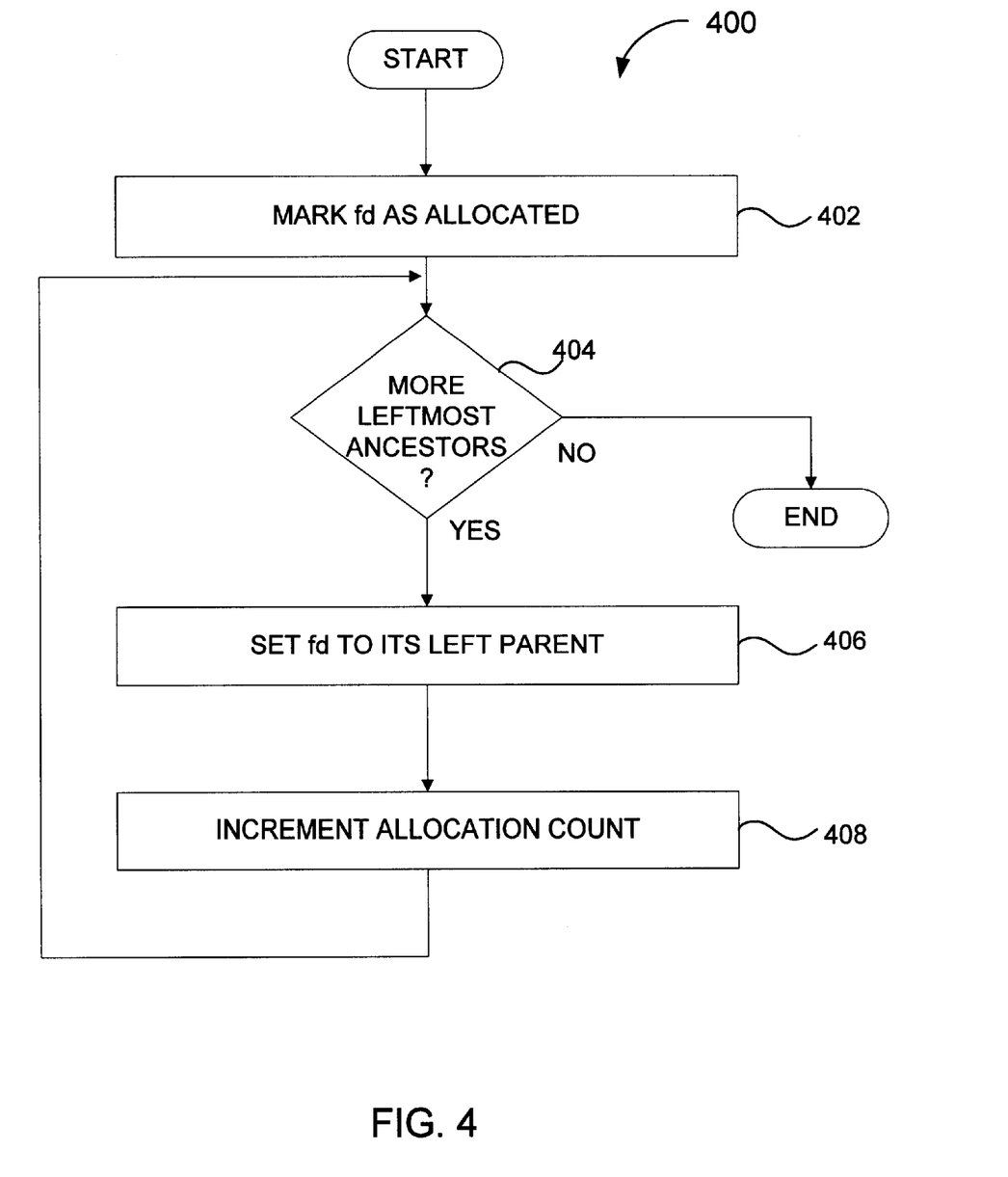
FIG. 4 is a flow diagram of file descriptor allocation processing according to one embodiment of the invention.

FIG. 4 is a flow diagram of file descriptor reservation processing 400 according to one embodiment of the invention. The file descriptor reservation processing 400 is, for example, processing performed in the operations 314, 320 and 324 of FIG. 3 or the operation 206 illustrated in FIG. 2.

The file descriptor reservation processing 400 begins after the fd table has been searched and the smallest available file descriptor (fd) has been identified. Then, the file descriptor reservation processing 400 marks 402 the file descriptor (fd) as allocated. Once the file descriptor (fd) is marked 402 is allocated the file descriptor (fd) becomes unavailable. Next, a decision 404 determines whether the node associated with the file descriptor (fd) has left-most ancestors. When a decision 404 determines that the node associated with the file descriptor (fd) has left most ancestors, then the file descriptor (fd) is set 406 to its left parent. Here, the file descriptor reservation processing 400 serves to ascend the fd tree to respective left parents, and may skip one or more levels in the fd tree in doing so. After the file descriptor (fd) has been set 406 to its left parent, an allocation count associated with the left parent is incremented 408. After the allocation count has been incremented 408, the file descriptor reservation processing 400 returns to repeat the decision 404 and subsequent blocks, so that the allocation counts for each of the left parent nodes (left most ancestors) associated with the file descriptor (fd) that has been allocation are all updated. Once the decision 404 determines that there are no more left most ancestors to be updated, the file descriptor reservation processing 400 is complete and ends.

Although FIG. 4 describes file descriptor reservation processing 400 in the context of marking an identified file descriptor as allocated and then updating the allocation counts of its left most ancestors, similar processing occurs when a file descriptor is to be deallocated. The only difference with respect to the allocation being that the allocation count of the left most parents would be decremented instead of incremented at block 408. Next, two's-complement adjustments can be used to make LPARENT, RPARENT and CSIZE easy to determine. The value N can have the following form:

$$N = xxxx10 \ldots 0$$

that is, the binary representation of N consists of some string of bits, then a 1, then all zeroes. This amounts to nothing more than saying that N has a least-significant bit, which is true for any $N \neq 0$. Further, N and N−1 can be combined in useful ways, namely:

$$\begin{array}{rl} N = & xxxx10 \ldots 0 \\ N\text{-}1 = & xxxx01 \ldots 1 \\ \hline N\ \&\ (N\text{-}1) = & xxxx000000 \\ N\ |\ (N\text{-}1) = & xxxx111111 \\ N \wedge (N\text{-}1) = & 111111 \end{array}$$

where "&" represents a bitwise AND, "|" represents a bitwise OR, and "^"represents a bitwise exclusive OR.

Accordingly, these relationships suggest several easy ways to clear all but the LSB, which by the above described property (2) is exactly what is needed to determine CSIZE (N). Hence, the child size (CSIZE) can be determined by the following equation:

$$CSIZE(N) = (N-1) \wedge (N|(N-1))$$

Similarly, the left parent (LPARENT(N)), which requires that clearing the LSB of N, can be determined by the following equation:

$$LPARENT(N) = N\ \&\ (N-1)$$

Note in the above equations that $(N|(N-1))-N=CSIZE(N)-1$. Hence, the right parent (RPARENT) can be determined by the following equation:

$$RPARENT(N) = (N|(N-1))+1$$

Finally, to accommodate fd's beginning at zero (0), the above equations can be adjusted by +/−1 to move the fd range from [1, 2^n] to [0, 2^n−1]. Consequently, the above equations become:

$$CSIZE(N) = N \wedge (N|(N+1))$$

$$LPARENT(N) = (N\ \&\ (N+1))-1$$

$$RPARENT(N) = N|(N+1)$$

The invention can be implemented in a variety of ways. One implementation of the invention is provided in the computer program code (C code) listed below. The computer program code includes two methods: fd_find and fd_reserve. The method fd_find locates the smallest available file descriptor, and the method fd_reserve updates its availability and the appropriate allocation counts.

```
static int
fd_find(uf_info_t *fip, int minfd)
{
   int size, ralloc, fd;
   for (fd = minfd; (uint_t)fd < fip->fi_nfiles; fd | = fd + 1) {
      size = fd ^ (fd | (fd + 1));
      if(fip->fi_list[fd].uf_alloc == size)
         continue;
      for (ralloc = 0, size >>= 1; size != 0; size >>= 1) {
         ralloc += fip->fi_list[fd + size].uf_alloc;
         if(fip->fi_list[fd].uf_alloc == ralloc + size) {
            fd += size;
            ralloc = 0;
         }
      }
      return (fd);
   }
   return(-1);
}
static void
fd_reserve(uf_info_t *fip, int fd, int incr)
{
   int pfd;
   uf_entry_t *ufp = &fip->fi_list[fd];
   for (pfd = fd; pfd>=0; pfd = pfd & (pfd + 1)) -1)
      fip->fi_list[pfd].uf_alloc += incr;
   ufp->uf_busy += incr;
}
```

The data structures that fd_find( ) and fd_reserve( ) refer to uf_entry and uf_info are explained as follows.

```
/*
 * Entry in the per-process list of open files.
 */
typedef struct uf_entry {
   struct file   *uf_file;    /* file pointer */
   int           uf_alloc;    /* right subtree allocation count */
   int           uf_busy;     /* file is allocated */
} uf_entry_t;
/*
 * Per-process file information.
 */
typedef struct uf_info {
   int           fi_nfiles;   /* number of entries in fi_list[ ] */
   uf_entry_t    *fi_list;    /* current file list */
} uf_info_t;
```

The invention is preferably implemented in software, but can be implemented in hardware or a combination of hardware and software. The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices, carrier waves. The computer readable medium can also be distributed over a network coupled computer systems so that the computer readable code is stored and executed in a distributed fashion.

Figure 5A:
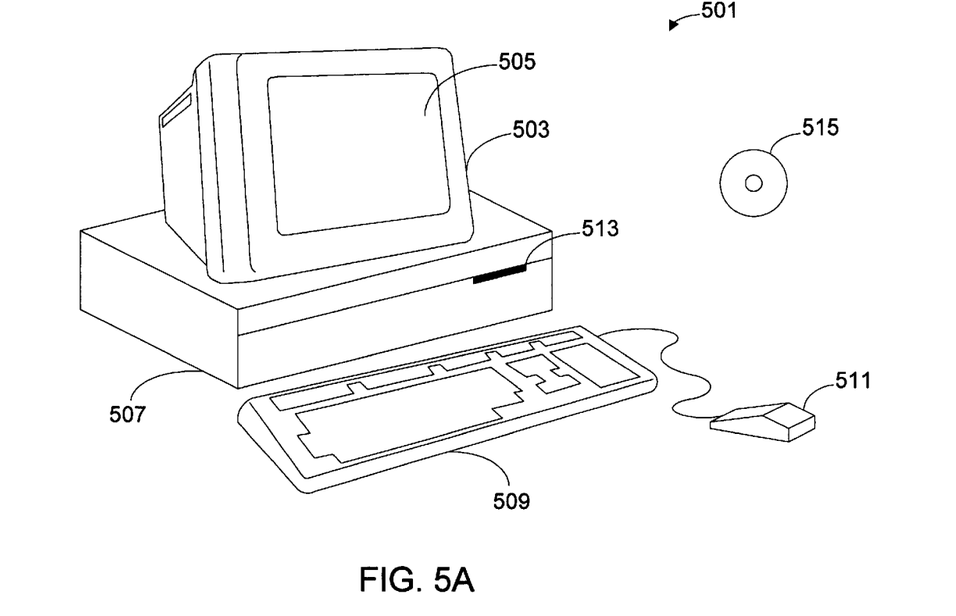
FIGS. 5A and 5B illustrate an example of a computer system that may be used in accordance with the invention to provide improved file descriptor allocation.
Figure 5B:
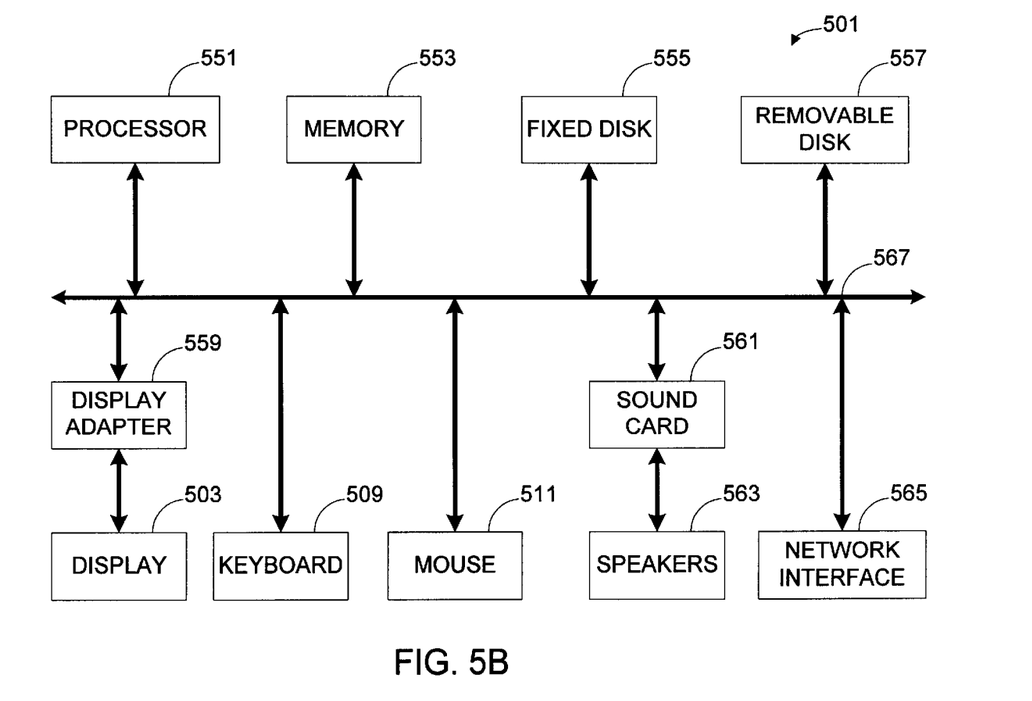

FIGS. 5A and 5B illustrate an example of a computer system that may be used in accordance with the invention to provide improved file descriptor allocation. FIG. 5A shows a computer system 501 that includes a display 503, screen 505, cabinet 507, keyboard 509, and mouse 511. Mouse 511 may have one or more buttons for interacting with a graphical user interface. Cabinet 507 houses a CD-ROM drive 513, system memory and a hard drive (see FIG. 5B) which may be utilized to store and retrieve software programs incorporating computer code that implements the invention, data for use with the invention, and the like. Although CD-ROM 515 is shown as an exemplary computer readable storage medium, other computer readable storage media including floppy disk, tape, flash memory, system memory, and hard drive may be utilized. Additionally, a data signal embodied in a carrier wave (e.g., in a network including the Internet) may be the computer readable storage medium. In one implementation, an operating system for the computer system 501 is provided in the system memory, the hard drive, the CD-ROM 15 or other computer readable storage medium and serves to incorporate the computer code that implements the invention.

FIG. 5B shows a system block diagram of computer system 501 used to execute the software of an embodiment of the invention. As in FIG. 5A, computer system 501 includes monitor 503 and keyboard 509, and mouse 511. Computer system 501 further includes subsystems such as a central processor 551, system memory 553, fixed storage 555 (e.g., hard drive), removable storage 557 (e.g., CD-ROM drive), display adapter 559, sound card 561, speakers 563, and network interface 565. The central processor 551, for example, can execute computer program code (e.g., an operating system) to implement the invention. An operating system is normally, but necessarily) resident in the system memory 553 during its execution. Other computer systems suitable for use with the invention may include additional or fewer subsystems. For example, another computer system could include more than one processor 551 (i.e., a multi-processor system) or a cache memory.

The system bus architecture of computer system 501 is represented by arrows 567. However, these arrows are illustrative of any interconnection scheme serving to link the subsystems. For example, a local bus could be utilized to connect the central processor to the system memory and display adapter. Computer system 501 shown in FIG. 5B is but an example of a computer system suitable for use with the invention. Other computer architectures having different configurations of subsystems may also be utilized.

The advantages of the invention are numerous. Different embodiments or implementations may yield one or more of the following advantages. One advantage of the invention is that appropriate file descriptors to be allocated can in general be located (i.e., via searching) much more efficiently than conventionally achieved. Namely, in one embodiment, the appropriate file descriptors can be allocated in logarithmic time. Another advantage of the invention is that the approach utilized is well suited for use with operating systems that support large number of file descriptors.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for allocating a file descriptor for a computer system, comprising:

(a) providing a plurality of file descriptors in a tree like data structure with subtrees, the tree like data structure having a plurality of nodes associated with the plurality of file descriptors representing files that are available to be allocated by the computer system, each of the nodes in the tree like data structure representing a numeric value of one of the file descriptors, wherein an allocation count for each node indicates the number of nodes allocated considering the node and those of said nodes in an associated subtree of said node;

(b) searching the tree like data structure to determine a smallest one of the file descriptors that is available for allocation; wherein the searching is performed by ascending or descending the tree like data structure at least partially based on one or more of the allocation counts; and (c) allocating the one of the file descriptors in the tree like data structure that is determined to be the smallest.

2. A method as recited in claim 1, wherein each of the file descriptors is an integer, and the plurality of file descriptors are a sequential series of integers.

3. A method as recited in claim 1, wherein said method is a computer implemented method performed by an operating system of a computing system, wherein said searching (b) and said allocating (c) are performed after a file open command has been issued to open a file, and wherein the allocated one of the file descriptors is used as a reference for the file being opened.

4. A method as recited in claim 3, wherein said searching (b) comprises:

(b1) ascending the tree like data structure from a minimum position until reaching a right subtree including at least one available file descriptor; and (b2) descending the right subtree to locate the smallest one of the file descriptors in the right subtree that is available.

5. A method as recited in claim 4, wherein each of the file descriptors is an integer, and the plurality of file descriptors are a sequential series of integers.

6. A method as recited in claim 1, wherein the tree like data structure is an infix binary tree.

7. A method as recited in claim 6, wherein said searching (b) comprises:

(b1) ascending the tree like data structure from a minimum position until reaching a right subtree including at least one available file descriptor; and (b2) descending the right subtree to locate the smallest one of the file descriptors in the right subtree that is available.

8. A method as recited in claim 1, wherein said searching (b) comprises:

(b1) ascending the tree like data structure from a minimum position until reaching a right subtree including at least one available file descriptor; and (b2) descending the right subtree to locate the smallest one of the file descriptors in the right subtree that is available.

9. A data structure for use by a computer program in managing allocation of file descriptors which represent files that are available for use by the computer program, said data structure comprising:

a plurality of nodes, each of said nodes representing a numeric value of one of the file descriptors, the file descriptors representing files that are available for allocation by the computer program, said nodes being arranged in a tree like arrangement with subtrees; and an allocation count provided for each of said nodes, said allocation count for each node indicates the number of nodes allocated in said node and its associated subtree.

10. A data structure as recited in claim 9, wherein the tree is an infix binary tree.

11. An infix binary tree for use by a computer program in managing allocation of file descriptors which represent files that are available on the computer system, said infix binary tree comprising:

a plurality of nodes arranged in a tree like arrangement with subtrees, each of said nodes representing a numeric value of one of the file descriptors, the file descriptors representing files that are available for allocation on the computer system; and an allocation count provided for each of said nodes, wherein said allocation count for each node indicates the number of nodes allocated considering the node and those of said nodes in an associated subtree of said node.

12. An infix binary tree as recited in claim 11, wherein the associated subtree is a right subtree.

13. An infix binary tree as recited in claim 12, wherein the associated subtree is a left subtree.

14. An infix binary tree as recited in claim 11, wherein the smallest available file descriptor can be located within said infix binary tree by searching said infix binary tree in logarithmic time.

15. An infix binary tree as recited in claim 11, wherein said nodes are arranged such that the numeric values increase left to right or right to left.

16. A computer readable medium including computer program code for allocating a file descriptor representing a file that is available for allocation in a computer system, comprising:

computer program code for providing a plurality of file descriptors in a tree like data structure with subtrees, the tree like data structure having a plurality of nodes associated with the plurality of file descriptors representing files that are available for allocation of the computer system, each of the nodes representing a numeric value of one of the file descriptors, wherein an allocation count for each node indicates the number of nodes allocated considering the node and those of said nodes in an associated subtree of said node; computer program code for searching the tree like data structure to determine a smallest one of the file descriptors that is available, wherein the searching is performed at least partially based on one or more of the allocation counts; and computer program code for allocating the one of the file descriptors represented in the tree like data structure that is determined to be the smallest.

17. A computer readable medium as recited in claim 16, wherein each of the file descriptors is an integer, and the plurality of file descriptors are a sequential series of integers.

18. A computer readable medium as recited in claim 16, wherein said computer program code is part of an operating system for a computing system.

19. A computer readable medium as recited in claim 18, wherein said computer program code for searching and said computer program code for allocating are performed after a file open command has been issued by the operating system to open a file.

20. A computer readable medium as recited in claim 16, wherein said computer program code for searching comprises: computer program code for ascending the tree like data structure from a minimum position until reaching a right subtree including at least one available file descriptor; and computer program code for descending the right subtree to locate the smallest one of the file descriptors in the right subtree that is available.

21. A computer system, comprising: a processor; and an operating system executable on said processor, said operating system operating to allocate a file descriptor in response to a system call, said operating system including at least: computer program code for providing a plurality of file descriptors in a tree like data structure, the tree like data structure having a plurality of nodes associated with the plurality of file descriptors representing files that are available for allocation of the computer system; computer program code for searching the tree like data structure to determine a smallest one of the file descriptors that is available; and computer program code for allocating the one of the file descriptors that is determined to be the smallest.

22. A computer system as recited in claim 21, wherein the tree like data structure is an infix binary tree.

* * * * *